No. 684,462. Patented Oct. 15, 1901.
W. C. SARGEANT & J. J. BARKER.
DETACHABLE SUPPORTING DEVICE FOR HOSE PIPES OR NOZZLES.
(Application filed Mar. 6, 1901.)
(No Model.) 2 Sheets—Sheet 1.
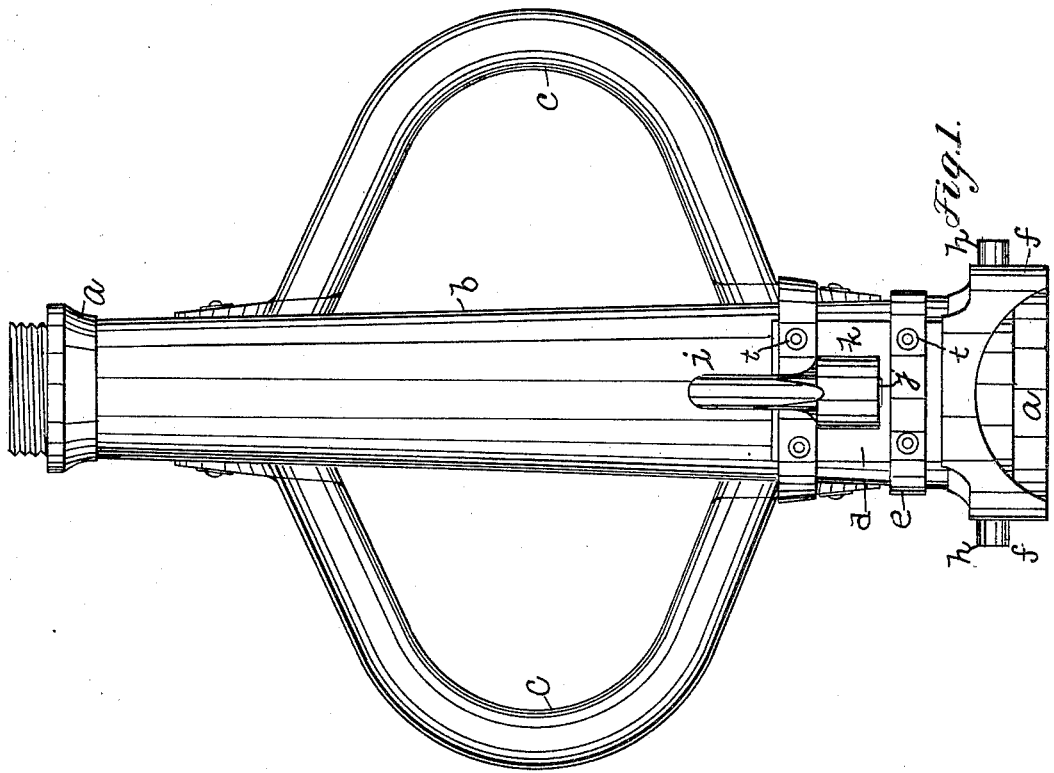
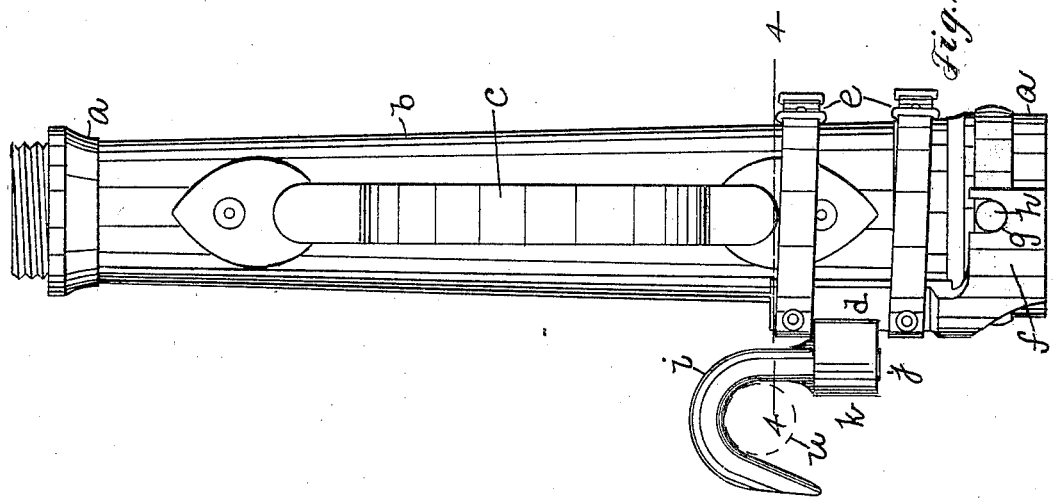
Witnesses.
C. H. Gannett
J. Murphy.
Inventors,
Walter C. Sargeant
John J. Barker
by Jas. H. Churchill
Atty.
THE NORRIS PETERS CO., PHOTO-LITHO., WASHINGTON, D. C.

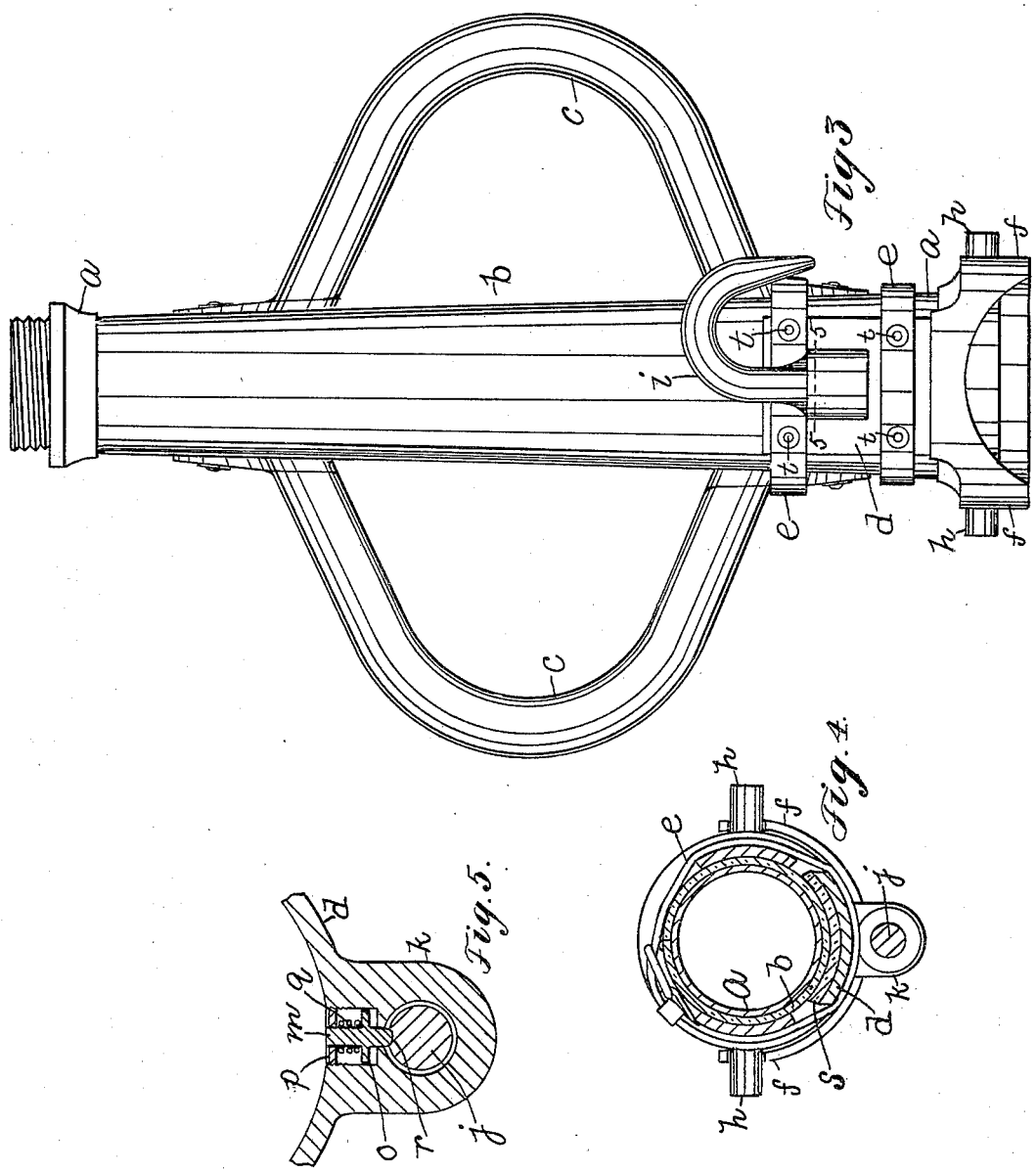

UNITED STATES PATENT OFFICE.

WALTER C. SARGEANT, OF MELROSE, AND JOHN J. BARKER, OF ARLINGTON HEIGHTS, MASSACHUSETTS.

DETACHABLE SUPPORTING DEVICE FOR HOSE PIPES OR NOZZLES.

SPECIFICATION forming part of Letters Patent No. 684,462, dated October 15, 1901.

Application filed March 6, 1901. Serial No. 50,060. (No model.)

*To all whom it may concern:*

Be it known that we, WALTER C. SARGEANT, residing in Melrose, and JOHN J. BARKER, residing in Arlington Heights, in the county of Middlesex and State of Massachusetts, citizens of the United States, have invented an Improvement in Detachable Supporting Devices for Hose Pipes or Nozzles, of which the following description, in connection with the accompanying drawings, is a specification, like letters on the drawings representing like parts.

This invention relates to a removable supporting device for hose pipes or nozzles of substantially large size, such as now commonly employed in the fire departments of cities, and has for its object to provide a simple, cheap, and efficient device which can be attached to hose pipes or nozzles now in use at a minimum expense.

The device is provided with means for engaging the round of a ladder, which means may and preferably will be a hook having a a threaded shank which engages a threaded socket in a boss or projection on the body portion of the device, and in order to prevent longitudinal movement of the device on the pipe or nozzle by the reactive force of the stream of water issuing from said pipe or nozzle we have provided means for locking the device to the hose pipe or nozzle. Provision is also made to prevent cutting or abrading the leather or other material usually covering the pipe or nozzle. These and other features of this invention will be pointed out in the claims at the end of this specification.

Figure 1 is a front elevation of a hose pipe or nozzle provided with a supporting device embodying this invention; Fig. 2, a side elevation of the hose pipe or nozzle shown in Fig. 1 looking toward the left; Fig. 3, a front elevation of the pipe or nozzle with the hook in its inoperative position; Fig. 4, a section on the line 4 4, Fig. 2; and Fig. 5, a sectional detail on an enlarged scale, taken on the line 5 5, Fig. 3.

The hose pipe or nozzle $a$, of metal, provided with a covering $b$, of leather, and handles $c$, of like material, attached to said covering, may be the same as now commonly employed in the fire departments of cities. The pipe or nozzle $a$, in accordance with this invention, is provided with a removable supporting device, which may and preferably will be made as herein shown and comprises, essentially, a metal body portion $d$, preferably curved to conform to the rounded form of the pipe and provided with means for attaching it to the said pipe and with means for locking it against longitudinal movement on said pipe.

The means employed for attaching the body portion $d$ to the pipe or nozzle may be straps $e$, of leather or other suitable material, and the means for locking the said body portion against longitudinal movement may be rearwardly-extended arms $f$, provided with recesses or notches $g$, which coöperate with suitable lugs or projections $h$ on the pipe or nozzle $a$. The body portion $d$ is adapted to be engaged with the round of a ladder, preferably by means of a hook $i$, provided with a screw-threaded shank $j$, which engages a screw-threaded socket in a boss or projection $k$ on the metal body portion $d$. The threaded shank of the hook affords a strong connection between the hook and the metal body portion $d$, and thus avoids liability of the connection between the hose pipe or nozzle and the round of the ladder being broken when subjected to severe strain, as occurs in use.

The hook $i$ may be turned inward toward the pipe or nozzle when not in use (see Fig. 3) and may be frictionally held in this position by means of a brake, which may be made as shown in Fig. 5.

The brake referred to consists of a rod or stem $m$, movable in a recess $n$ in the body portion $d$ and the boss $k$ and guided in said recess by a collar $o$ and a nut $p$, which engages a threaded portion of the recess. The brake-rod $m$ is kept in frictional engagement with a smooth portion of the shank $j$ by a spiral spring $q$, interposed between the collar $o$ and nut $p$. The end of the brake rod or stem is made round and preferably enters a slight depression $r$ in the shank $j$, so that when the hook is in its innermost position the rounded end of said rod will enter said depression and assist the spring $q$ in holding the hook against accidentally being thrown or moved outward when the nozzle is carried about.

The brake-rod is disengaged from the depression $r$ by the turning of the hook from the position shown in Fig. 3 to that shown in Figs. 1 and 2, in which latter position the said hook is in position to be engaged with the round of a ladder, (indicated by the dotted-line circle $u$ in Fig. 2.)

From the above description it will be evident that the supporting device may be quickly attached to and detached from the hose pipe or nozzle, and therefore can be applied to hose pipes or nozzles now in use at a minimum cost.

In the operation of the device, with the hook engaging the round of the ladder, the reactive force or back pressure of the water tends to move the hose pipe or nozzle backward, and thus places a great strain upon the straps $e$, which are liable to break under such strain, with attending liability to injure the fireman, and, further, this back pressure is liable to force the lower part of the body portion $d$ away from the pipe or nozzle when the latter is turned on the round $u$ in the act of changing the direction of the water. Both of these objectionable features are removed or avoided by locking the body portion $d$ to the pipe or nozzle against movement longitudinally or laterally with relation to said pipe or nozzle. This locking of the body portion is accomplished, as above described, by the notched arms $f$ engaging the lugs or projections $h$ on the pipe or nozzle. In order to avoid cutting or abrading the covering $b$ on the pipe or nozzle, which might be effected when the strain is placed on the body portion in the act of turning the hose on the round $u$ as a fulcrum, the said body portion has attached to its inner side near its upper portion a pad $s$, of leather or other cushioning material. The pad $s$ may be secured to the body portion by the rivets $t$, employed to attach the straps $e$.

We may prefer to use a movable hook; but we do not desire to limit our invention in this respect, as the body portion of the attachment may be provided with a stationary hook.

We claim—

1. The combination with a hose pipe or nozzle, of a detachable supporting device adapted to be secured to said pipe or nozzle and comprising a body portion provided with means for engaging the round of a ladder and with rearwardly-extended rigid arms adapted to engage said nozzle on opposite sides of the same and lock the said body portion to the pipe or nozzle against longitudinal and lateral movement, substantially as described.

2. The combination with a hose pipe or nozzle provided with lugs or projections, of a detachable supporting device comprising a metal body portion provided with rearwardly-extended arms having notches or recesses to engage said lugs or projections, and means to secure said body portion to the hose pipe or nozzle, substantially as described.

3. The combination with a hose pipe or nozzle, of a detachable supporting device adapted to be secured to said pipe or nozzle and comprising a body portion provided with means for locking the said body portion to the pipe or nozzle against longitudinal or lateral movement, and with a hook having a threaded shank engaging a threaded socket in said body portion, substantially as described.

4. The combination with a hose pipe or nozzle, of a detachable supporting device adapted to be secured to said pipe or nozzle and comprising a body portion provided with means for locking the said body portion to the pipe or nozzle against longitudinal or lateral movement, and with a movable hook rotatively supported by said body portion, and a brake to frictionally engage said hook, substantially as described.

5. A detachable supporting device for hose pipes or nozzles, comprising a metal body portion provided with means for attaching it to the said pipe, and with rearwardly-extended arms provided with locking notches or recesses, substantially as described.

6. A detachable supporting device for hose pipes or nozzles, comprising a metal body portion provided on its rear face with a pad of cushioning material, and having means for attaching it to the said pipe or nozzle, and with rearwardly-extended arms provided with locking notches or recesses, substantially as described.

In testimony whereof we have signed our names to this specification in the presence of two subscribing witnesses.

WALTER C. SARGEANT.
JOHN J. BARKER.

Witnesses:
JAS. H. CHURCHILL,
J. MURPHY.